C. HOLSCLAW.
DIE.
APPLICATION FILED OCT. 16, 1912.
1,249,961. Patented Dec. 11, 1917.
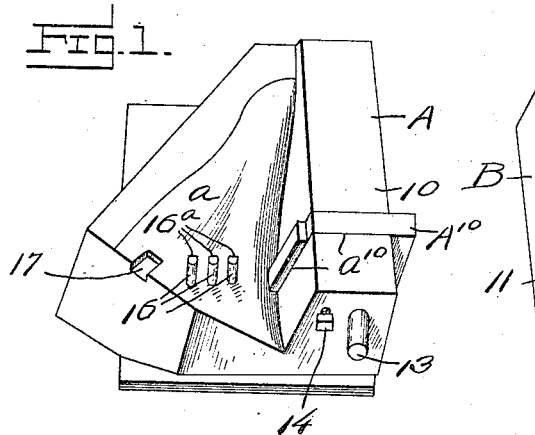
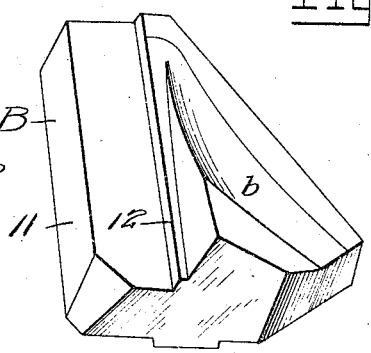
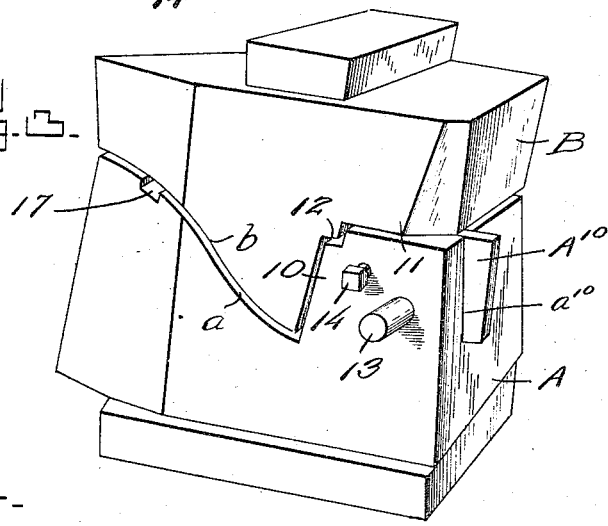
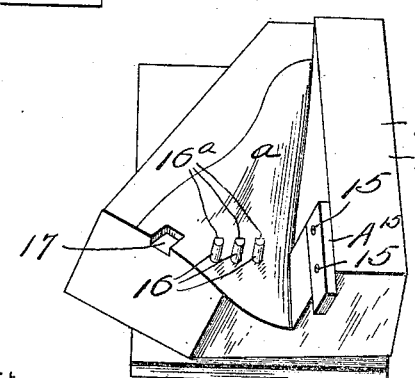
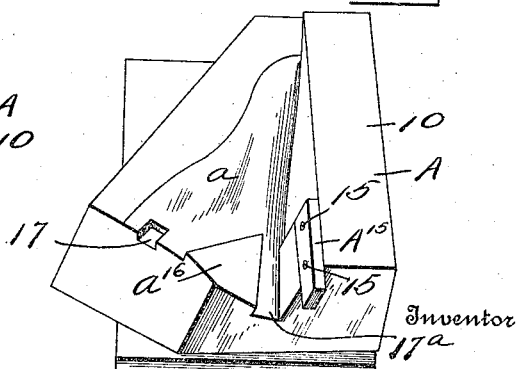
Witnesses
Inventor
Charles Holsclaw
By C. J. Stockman
Attorney

UNITED STATES PATENT OFFICE.

CHARLES HOLSCLAW, OF LOUISVILLE, KENTUCKY, ASSIGNOR TO B. F. AVERY & SONS, OF LOUISVILLE, KENTUCKY, A CORPORATION OF KENTUCKY.

DIE.

1,249,961.  Specification of Letters Patent.  Patented Dec. 11, 1917.

Application filed October 16, 1912.  Serial No. 726,019.

*To all whom it may concern:*

Be it known that I, CHARLES HOLSCLAW, a citizen of the United States, residing at Louisville, in the county of Jefferson and State of Kentucky, have invented new and useful Improvements in Dies, of which the following is a specification.

In the manufacture of plow shares it is customary to weld a longitudinal edge of a bar, hereinafter called "share bar," to the surface of a blade, hereinafter called "share blade," adjacent to the longitudinal edge of the latter. This welding operation has been performed under pressure in dies made for the purpose. Dies hitherto employed have been so constructed that the rear edge of the share bar was not protected against deformation and this has necessitated a grinding off of the rear edge of the share bar in order that it might accurately fit the forward edge of the landside. This grinding operation entails an expense to eliminate all or a very substantial part of which is one of the important objects of the present invention. Moreover, the upper or rear edge of the share blade must be accurately fitted to the lower or forward edge of the moldboard and dies employed in the welding operation hereinbefore referred to have been of such nature that the upper edge of the share blade has been ground to properly mate or joint with the lower edge of the moldboard. My invention, also, has for one of its important objects the provision of a die which will make it practicable to cut or shear the share blade to fit the moldboard.

Again, dies at present employed for welding share blades to share bars, in the manufacture of plow shares, have been so constructed that the labor of keeping them free from scale has imposed an important expense to substantially reduce which is one of the purposes of the present invention.

In short the present invention aims, among other things, to reduce to a very substantial extent the cost of plow shares by eliminating, or to a very substantial extent reducing, the necessity of grinding the share bar and share blade in order that they will accurately fit the landside and moldboard of the plow and also aims to produce a further economy in the production of the shares by means of a die which is so constructed that the labor of scratching the scale therefrom is eliminated.

A further aim of the invention is to eliminate a substantial percentage of the cost of dies hitherto employed in the production of plow shares.

The accompanying drawings show dies of constructions which satisfactorily carry into practice the several stated purposes of the invention, but whose details may be varied without departing from the spirit of the invention or the scope of the subjoined claims. In said drawings:—

Figures 1 and 2 are perspective views of the complementary dies, respectively, showing the preferred construction of a pair of dies embodying the present improvements and adapted for conjoint use in the production of a plow share according to the present invention.

Fig. 3 is a perspective view showing the two dies in the position they occupy when they have been brought together.

Figs. 4 and 5 are perspective views of one of the dies showing modified forms thereof.

Similar characters of reference denote corresponding parts in the several views.

A designates the lower die and B designates the upper die. These dies are made of steel of suitable kind or grade, of which semi-steel is an example.

The die A has a cavity forming a seat $a$ which is of gradually increasing depth laterally and longitudinally and of gradually increasing width from one end toward the other, and the die is formed along one side of said seat or cavity with a member 10 which forms an approximately vertical wall at the deeper side thereof. The die A is also provided with an end wall (16 Figs. 1 and 4, or $A^{16}$ Fig. 5) hereinafter more particularly set forth, which extends across the wider end of the seat or cavity and is interrupted adjacent to the member 10, and at other places also, if desired. The described shape of the cavity and the interruption or interruptions in the end wall facilitate the removal of the scale which is formed or deposited in the use of the die by eliminating obstructions which prevent the easy removal of the scale.

The upper die B has a part $b$ arranged to extend over the seat or cavity $a$ and to form with the latter a space for the blade of the share, and also has a depression forming a longitudinal outwardly extending member 11 which extends over the member 10 when the two dies have been brought into operative relation. In the angle between the surface $b$ and the member 11, the upper die is formed with a longitudinal rib 12 whose purpose will hereinafter be more fully understood.

In each of the forms of the present invention the member 10 of the die A is provided with a laterally projecting element one of whose important purposes is to prevent deformation of the end of the share bar during the welding operation.

In the form shown in Figs. 1, 2 and 3, the laterally projecting element referred to, designated $A^{10}$, is a plate which extends through an aperture $a^{10}$ formed transversely through the member 10 and is fixedly secured, but in a manner which permits it to be removed or adjusted, by suitable means, such as the dowel pin 13 and screw 14, for example. This plate is formed of tool steel and is so arranged that the side surface of its projecting end, which engages the rear end of the share bar, is disposed at an angle to the inner surface of the side wall formed by the member 10 and extends across said inner surface, whereby it is so arranged with relation to the end of the share bar that the latter will be engaged substantially throughout its entire area by said surface of the projecting portion of the element $A^{10}$, said element thereby forming a stop wall capable of preventing deformation of the end of the share bar. The adjustability of this element $A^{10}$ enables the extent of its projection from the member to be adjusted in accord with share bars of different thicknesses and its removability enables it to be renewed when worn, thereby prolonging the life of the die.

In the modified form shown in Fig. 4, the stop wall to engage the rear end of the share bar is formed in part by a section $a^{15}$ which projects laterally from and is integral with the member 10 but terminates below the upper surface of the latter, and in part by a bar of tool steel, $A^{15}$, which rests on the section $a^{15}$ and extends longitudinally of the member 10 and is secured to the latter by suitable means, as the screws 15. It will be noted that in this form of the invention, the inner edges of the section $a^{15}$ and bar $A^{15}$ form a surface disposed at an angle to and extending across the inner surface of the side wall, to engage the end of the share bar substantially throughout the area of said end.

It will be understood that in the use of the die A, the share-blade (or the stock or part which ultimately becomes the blade of the share) is arranged flatwise upon the surface of the seat or cavity $a$ and the share bar is arranged longitudinally thereof with its lower edge upon the upper surface of the blade (as usual) its side against the inner side of the member 10 and its end against the stop wall substantially from top to bottom.

The end of the seat $a$ in the die A which is contiguous to the upper edge of the share-blade, is provided with a gage or stop-wall which is interrupted to facilitate the removal of scale from the cavity $a$. This wall may be provided by a raised surface $a^{16}$ having a channel $17^a$, as shown in Fig. 5, but preferably is formed by a plurality of hard steel pins or upward projections 16 which are spaced apart and preferably have flattened forward surfaces $16^a$, as shown best in Figs. 1 and 4. The recess 17 shown in the lower die is for the tongs used to facilitate removal of the share from the die.

In the manufacture of a share by mechanisms employing the dies of the present invention the share-blade is arranged in the seat $a$ with its edge which is to be fitted to the moldboard against the gage wall $a^{16}$ or 16, whichever is employed, and the share-bar is arranged with its side surface against the inner wall of the member 10 and its rear end against the stop wall formed by the element $A^{10}$ or the parts $a^{15}$, $A^{15}$, according to which form of stop wall is being employed. The blade and bar are at a welding heat and are welded to each other under pressure between the upper and lower dies, the longitudinal rib 12 of the upper die being in position to bear upon the upper edge of the share bar and press it down upon the blade. It will be noted that as the element $A^{10}$, or the part $A^{15}$, whichever is employed, is made of hard steel and is arranged in absolutely correct position, the end of the bar which is against the same and which must mate the end of the landside, is smooth and straight when it leaves the die and provides an element from which one may gage in removing, as by shearing, for example, surplus metal from that end of the blade which is to engage the edge of the moldboard, thereby forming the blade to fit the moldboard without grinding. It will also be noted that the construction of the die A is such that there are no pockets or blade walls in the die and that the die, being made of steel, produces a smoother share than is possible when cast-iron dies are used, and further it will be noted that the structure of said die is such that it may be readily cleaned of scale.

It has been found that by the use of the present invention in the production of plow shares, the cost of dies, the cost of labor in grinding and fitting the shares to the moldboards and landsides of the plows, and the number of vulcanite wheels, with the attendant cost of the latter and expense for power, etc., incidental to the use thereof, each has been eliminated, and, moreover, that the appearance of the shares and the accurate fitting of the same to the moldboard and landside has been rather improved than otherwise.

While the invention has herein particularly been described with reference to its use in the welding together of the bars and blades forming plow shares yet it will be understood that it may be otherwise embodied without departing from the spirit thereof as defined by the subjoined claims, and therefore I would have it understood that I do not restrict myself to the specific embodiment and use herein set forth.

Having now described the invention what I believe to be new and desire to secure by Letters Patent, is:—

1. A welding die for plow shares, said die having a cavity arranged to receive the share blade, said cavity having a side wall provided with an element projecting laterally therefrom and adapted to engage and prevent deformation of the end of the share bar, the said element being arranged with its surface to engage the share bar disposed at an angle to and extending across the inner surface of the side wall, the die also having an end wall arranged to engage the end of the blade of the share, the end wall being spaced from the side wall and being interrupted.

2. A welding die having a cavity provided with a side wall, said wall having an opening extending through the same from its inner to its outer surface, a hard steel plate extending through said opening and having its inner end arranged in the cavity, and means for adjustably fixing the plate to the side wall.

3. A welding die having a cavity and a side wall, means projecting from the side wall and forming a wall which partially closes one end of the cavity, the said cavity having a second end wall formed of a plurality of spaced projections, the two end walls being arranged at the same end of the cavity.

4. A welding die for plow shares having its body provided with a separately-formed hard steel element arranged to engage and prevent deformation of the rear end of the share bar, the body of the die being made of softer metal and provided with an interrupted wall arranged to engage the rear edge of the share blade.

5. A pair of complementary metal dies for plow shares, one of which is formed with a cavity having a side wall provided with a hard steel element arranged to engage the rear end of the share bar, said die also having a wall which is interrupted and is disposed at the same end of the cavity as said element and is arranged to engage the rear edge of the share blade, and the other of which dies has a longitudinal rib to engage the contiguous surface of the share bar.

6. A pair of complementary steel dies for plow shares, one of which has a cavity with a side wall provided with a lateral opening and a hard-steel element in said opening, the said element being removably and fixedly secured in position and arranged to engage and prevent deformation of the end of the share bar; said die also having an interrupted stop wall formed of a plurality of separated projections arranged to engage the rear edge of the share blade, the other of said dies being recessed to receive said side wall and provided within said recess with a longitudinal rib to engage the contiguous surface of the share bar.

7. A welding die for plow shares, said die comprising a cavity arranged to receive the share blade and having a side wall provided with an element projecting laterally therefrom against one face of which the end of the share bar rests during the welding operation, said face being shaped to conform to the shape of the end of the finished share bar whereby the true shape of the end of the share bar is maintained during the welding operation.

8. A welding die for plow shares having a cavity arranged to receive the share blade, said cavity having a side wall and a removable element projecting laterally from said side wall and lying in such position that the end of the share bar may lie in contact therewith during the welding operation, the contacting face of the removable element being shaped to conform to the finished shape of the end of the share bar.

In testimony whereof I have hereunto set my hand in presence of two subscribing witnesses.

CHARLES HOLSCLAW.

Witnesses:
 WM. M. JOHNSTON,
 J. FRED HARTKEMEIER, Jr.